Aug. 18, 1953 A. A. BARCO ET AL 2,649,499
SIMPLIFIED COLOR TELEVISION RECEIVER
Filed Aug. 22, 1951
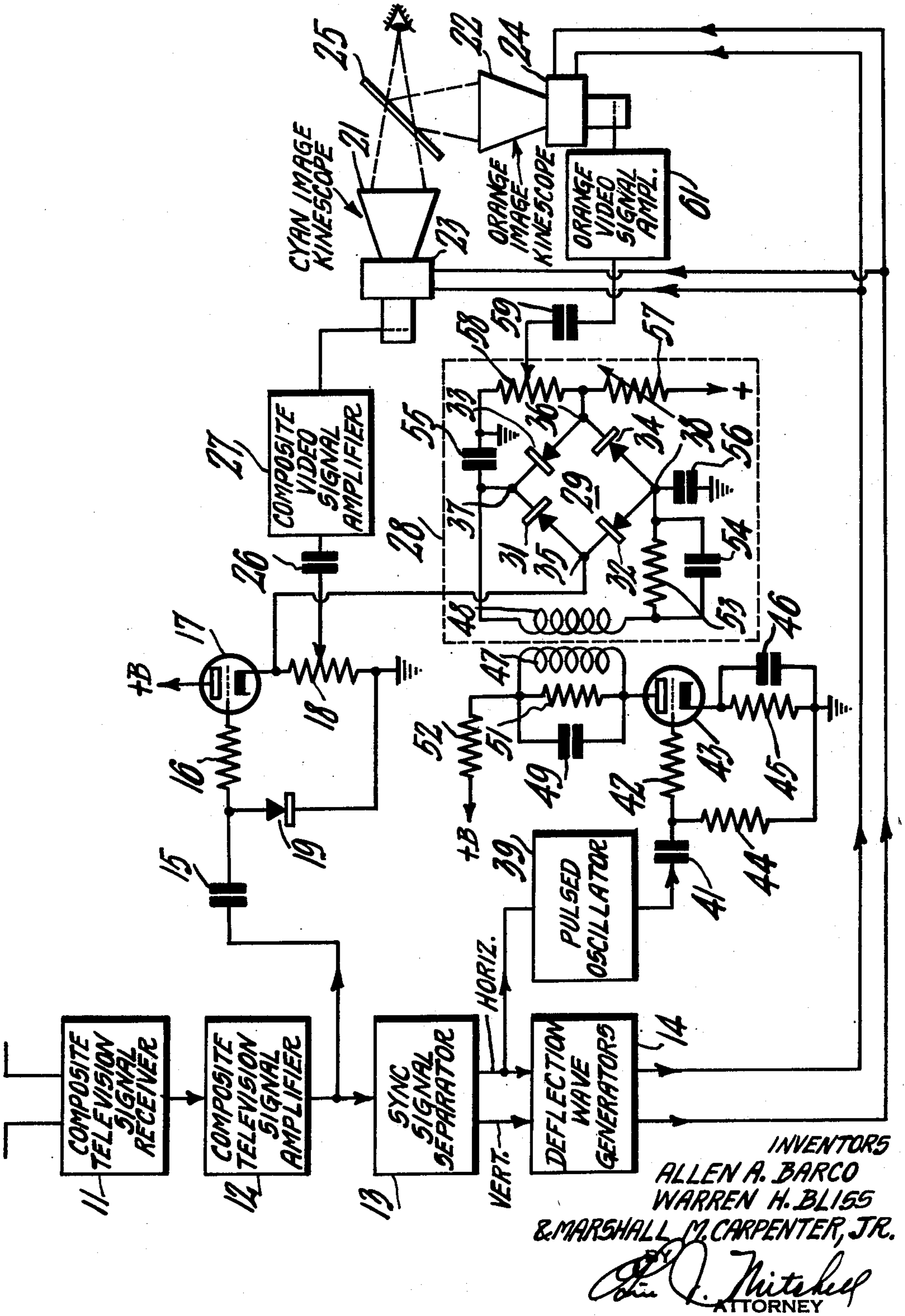
INVENTORS
ALLEN A. BARCO
WARREN H. BLISS
& MARSHALL M. CARPENTER, JR.
ATTORNEY Patented Aug. 18, 1953 2,649,499

UNITED STATES PATENT OFFICE 2,649,499

SIMPLIFIED COLOR TELEVISION RECEIVER

Allen A. Barco, Warren H. Bliss, and Marshall M. Carpenter, Jr., Princeton, N. J., assignors to Radio Corporation of America, a corporation of Delaware Application August 22, 1951, Serial No. 243,042

6 Claims. (Cl. 178—5.4)

This invention relates to color television systems and particularly to relatively simple and inexpensive image-reproducing apparatus.

One type of color television system in which the invention may be embodied operates in accordance with the elemental multiplex principle as described in a publication titled "A Six-Megacycle Compatible High-Definition Color Television System" by RCA Laboratories Division, RCA Review, December 1949, volume X, No. 4, page 504. In such a system, a plurality of color representative video signals are generated, transmitted, and received sequentially for each of the primary colors of a multiplicity of elemental image areas. The rate at which these video signals representing each of the different colors is repeated is commonly referred to as the reference, or color sampling, frequency. A system of this character forms the subject matter of a copending U. S. application of John Evans, Serial No. 111,384, filed August 20, 1949, and titled "Color Television."

Such signals may be produced in a number of different ways, none of which are essential to an understanding of the present invention. Irrespective of the manner in which the color representative video signals are generated and transmitted, a sub-carrier wave is produced. This sub-carrier wave has a frequency equivalent to one of the higher order video signals which may be transmitted over a channel having an approximately 4 megacycle bandwidth. The sub-carrier wave has instantaneous amplitudes which are representative respectively of the different color components of successive elemental image areas. Another way of defining the character of the color video signal modulation of the sub-carrier wave is that it is phase-modulated to represent the hues of the subject. Additionally, it has an amplitude modulation which is representative of the saturation of the subject colors.

In order to accurately reproduce an image from such a color representative video signal it is necessary that the sub-carrier wave be demodulated in phase in a suitable manner. It will be understood that the carrier wave represents the true colors of the subject only at successive instants which are displaced in time or phase. At all other times, or phases of the sub-carrier wave, it represents a combination of two or more of the subject colors. Hence, in order to effect an accurate reproduction of, say, a three-color video signal of the character described, it is necessary to demodulate or sample the carrier wave by apparatus having an element or channel for each of the three colors. Also, the image-reproducing apparatus which is to be operated under the control of the demodulated color representative video signals must have a component for each of the colors in which the image is to be reproduced. Accordingly, in a three-color system, for example, three demodulating channels and three image-reproducing components are required for a substantially accurate reproduction of the image.

It has been determined, however, that reasonably good images may be reproduced in a smaller number of colors than are represented by the transmitted video signals. In a three-color television system, for example, images may be reproduced in two colors which are good enough approximations of the original colors to provide considerable entertainment value. The two approximate colors may be produced by suitably combining different pairs of the three primary colors. A considerable simplification and reduction in the cost of such image-reproducing apparatus may be effected by such an arrangement.

Accordingly, it is an object of the present invention to provide a novel, relatively simple and inexpensive color television receiving system, whereby an image may be reproduced in a smaller number of colors than are represented by the received video signals.

Another object of the invention is to provide a color television video signal-receiving system for the reproduction of a color television image in a smaller number of colors than are represented by the received color representative video signals and in which a minimum of video signal demodulation apparatus is required.

In accordance with the present invention, there is provided means for extracting from a color video signal-modulated sub-carrier wave video signals which are representative of a first one of the colors in which the image is to be reproduced. In the present case, this one color generally will be a combination of two of the primary colors represented by the video signals. These extracted signals are employed to energize an image-reproducing means capable of producing light having a color which is the same as the color represented by the extracted video signals. The composite television signal, including video signal components representing all of the primary colors of the subject, is employed without demodulation to energize a second image-reproducing means which is capable of producing light of a second image color. This second image color generally is one which is a combination of two others of the primary colors represented by the received video signals.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

The single figure of the drawing is a circuit diagram, partly in block form, of a color television signal-receiving and image-reproducing apparatus embodying the present invention.

Having reference now to the drawing, there is shown an embodiment of the invention in a color television system employing video signals which normally may be used for reproducing an image of a subject in three primary colors. It will be understood that a three-color system is referred to primarily in the interest of clarity, and that the invention is not necessarily limited for use in systems for reproducing images in only three colors. The receiving system includes a conventional composite television signal receiver 11. It will be understood that this apparatus may include such conventional components as a radio frequency amplifier, a frequency converter or first detector, an intermediate frequency amplifier and a second or signal detector. Accordingly, it will be understood that the composite television signal derived from the receiver 11 comprises a three-color video signal including a sub-carrier wave which is phase-modulated in accordance with the hue of the image to be reproduced. The composite signal also will be understood to contain the synchronizing signals.

The composite television signal is amplified by a composite television signal amplifier 12 coupled to the receiver 11. The output of the amplifier is divided into two channels, one of which is a video signal channel and the other of which is the synchronizing and deflection wave-generating channel. This latter channel may be entirely conventional and includes a sync signal separator 13 coupled to the amplifier 12 and functions to separate the horizontal and vertical synchronizing signals from the video signal and also from one another. The vertical and horizontal output circuits derived from the sync signal separator 13 are coupled to suitable deflection wave generators 14 which operate to produce substantially sawtooth waves at the line and field frequencies for the deflection of an electron beam in the usual manner.

The composite television signal amplifier 12 is coupled by a capacitor 15 and a series resistor 16 to the control grid of an input electron tube 17. The anode of this tube is connected directly to a source of positive potential such as indicated at +B and is operated as a cathode follower having for this purpose, a resistor 18 connected to its cathode. A unidirectional device, such as a crystal diode 19 connected to the grid circuit of the tube, acts as a clamping device to restore the direct current component to the video signals in the usual way. The input tube serves to feed the composite television signal to the two image-reproducing components by way of two different circuits.

One of the image-reproducing components is a kinescope 21 serving to produce light of color which is a combination of two of the colors represented by the received video signals. In the case of the three-color system, as assumed, in which the colors are red, green and blue, the kinescope 21 may be of a type capable of producing cyan colored light, which is a combination of green and blue colored light. It will be understood that the kinescope may be provided with a luminescent screen having phosphors capable of producing such a color. Alternatively, a kinescope producing substantially white light may be employed in conjunction with an optical filter capable of transmitting substantially cyan colored light. Also, the apparatus includes a second image-reproducing component such as a kinescope 22 which is capable of producing light of a second combination color such as orange, which is a combination of red and green colored light, for example. It will be understood that the kinescope 21 and 22 may be conventionally operated and provided with the usual electrode and other auxiliary structure such as deflection yokes 23 and 24, respectively. The deflection yokes are energized by suitable connections to the deflection wave generators 14 in a conventional manner.

The two images produced by the kinescopes 21 and 22 are suitably combined optically for simultaneous viewing. Such apparatus does not form an essential part of the present invention and, accordingly, has not been illustrated in any great detail. For the present purposes, however, it will be understood that there is provided a suitable color-selective reflector 25 placed relative to the kinescopes and to an observer somewhat in the manner shown. A suitable device for this purpose is a dichroic reflector of the type disclosed in U. S. Patent No. 2,420,168 granted May 6, 1947, to G. L. Dimmick and titled "Acromatic Light Reflecting and Transmitting Film." In the present case, the color-selective reflector 25 will be understood to have the property of reflecting orange light derived from the kinescope 22 and of transmitting, without substantial loss, cyan light derived from the kinescope 21.

In accordance with the present invention, the composite television signal is coupled by means such as a capacitor 26 from a selected point on the cathode follower resistor 18 of the input tube 17 to a composite video signal amplifier 27. The output of this amplifier is coupled to the electron beam control electrode structure of the kinescope 21 to produce an image on the luminescent screen of the kinescope having a cyan color.

The composite television signal derived from the cathode follower resistor 18 is also impressed upon a video signal demodulator such as a gating circuit 28. For illustrative purposes, the composite video signal demodulator or sampler 28 comprises a gating device including a varistor consisting of four matched crystal rectifiers 31, 32, 33 and 34 connected in a bridge circuit. The composite video signal is impressed upon an input terminal 35 and the sampled video signal is derived from an output terminal 36 which has a conjugate relationship to the input terminal. The sampler also has another pair of conjugate terminals 37 and 38 to which is applied a control wave for the sampling process.

The control wave is derived from a pulsed oscillator 39 which may be of the type shown in the book titled "Wave Forms" published by the McGraw-Hill Book Co., Inc., in Figures 4–45 at page 143. It is a Hartley oscillator capable of producing a sinusoidal wave output and susceptible of synchronous control by pulses at a frequency substantially equal to its natural frequency of oscillation. The frequency of the pulsed oscillator 39 should be the same as the color sampling, or reference, frequency used in the system. As previously described, this is the frequency of the sub-carrier wave which is phase-modulated by the video signals.

The output of the oscillator 39 is coupled by a capacitor 41, which preferably is variable for a purpose to be described, and a series resistor 42 to the control grid of a driver electron tube 43. A shunt resistor 44 is used in conjunction with the variable capacitor 41 for a phase adjusting operation to be described subsequently. A self-biasing circuit for the tube 43 is provided by a cathode-connected resistor 45 and a shunt capacitor 46. The anode of the tube 43 is connected to an output circuit which includes a primary winding 47 of the transformer having a secondary winding 48 coupled to the control terminals 37 and 38 of the varistor 29. The transformer primary winding 47 is tuned by a shunt capacitor 49 for resonance at the sub-carrier wave frequency. A resistor 51 provides the necessary damping in the tuned circuit. The output circuit further includes a voltage-dropping resistor 52 which is connected to a suitable source of positive potential such as indicated at +B.

The circuit by which the secondary winding 48 is coupled to the control terminals 37 and 38 of the varistor 29 includes a self-biasing network comprising a parallel connection of a resistor 53 and a capacitor 54. Also, the control terminals 37 and 38 are bypassed to ground respectively by neutralizing capacitors 55 and 56.

The sampler 28 also includes a variable resistor 57 coupled between the output terminal 36 and a point of positive potential. The purpose of this resistor is to so control the apparatus that there is no signal produced at the terminal when the video signal has a value representative of black in the subject. The output terminal 36 also is connected to a load resistor 58, the other terminal of which is connected to ground. This resistor preferably is part of a potentiometer the movable contact of which is coupled by a capacitor 59 to an orange video signal amplifier 61. The output of the orange video signal amplifier is coupled to the electron beam intensity control electrode of the orange kinescope 22.

In the operation of the described apparatus for the production of a two-color image from a three-color representative video signal, it is seen that the entire composite video signal is employed for the production of the cyan color image by means including the kinescope 21. The phase relationship between the reference frequency wave derived from the oscillator 39 and the composite video signal derived from the cathode resistor 18 of the tube 17 determines the color represented by the signal produced in the output resistor 58 of the sampler 28. In order that this signal be representative of the orange color of the image to be reproduced, it is necessary that the reference frequency wave have a phase which lies between the phase of the received sub-carrier wave representing red and that representing green. The necessary phase relationship between the reference frequency wave and the received sub-carrier wave is effected by manipulation of the variable capacitor 41. This capacitor, in conjunction with the resistor 44, forms a phase shifting network. The amount of phase shift is dependent upon the relative values of the components of the network. Accordingly, a suitable adjustment of the value of the capacitor 41 will enable the impression of the reference frequency wave upon the sampling apparatus 28 in the proper phase to produce the desired color representative video signal in the output circuit for energization of the orange image kinescope.

It may be seen from a consideration of the foregoing disclosure of an illustrative embodiment of the invention that there is provided a simplified and also a relatively inexpensive color television system for use in systems operating in accordance with the elemental multiplex principle. In the case where a two-color reproduction is to be effected from a three-color signal, the present invention requires the use of only a single video signal demodulator, or sampler, thereby simplifying and reducing the cost of the receiver.

The nature of the invention has been set forth in the foregoing disclosure of an illustrative embodiment thereof. Its scope is pointed out in the appended claims.

What is claimed is:

1. In a color television system of the type in which a composite television signal includes predetermined phases of a carrier wave which are modulated by video signals respectively representing a plurality of primary colors of a subject, apparatus for reproducing an image of said subject in a smaller number of colors than are represented by said video signals comprising, means for extracting from said video signal-modulated carrier wave video signals representative of a first one of the colors in which said image is to be reproduced, first means energizable to reproduce said first image color, means impressing said extracted video signals upon and energizing said first image-reproducing means, second means energizable to reproduce a second image color, and means impressing said composite television signal upon and energizing said second image-reproducing means.

2. In a color television system of the type in which predetermined phases of a carrier wave are modulated by video signals respectively representing a plurality of primary colors of a subject, apparatus for reproducing an image of said subject in a smaller number of colors than are represented by said video signals comprising, an image-reproducing device for each of the colors in which the image is to be reproduced, means for extracting from said complete video signal-modulated carrier wave video signals representative of one of the colors in which said image is to be reproduced, means impressing said extracted video signals upon a first one of said image-reproducing devices, and means impressing said complete video signal-modulated carrier wave upon a second one of said image-reproducing devices.

3. In a color television system of the type in which predetermined phases of a carrier wave are modulated by video signals respectively representing a plurality of primary colors of a subject, apparatus for reproducing an image of said subject in a smaller number of colors than are represented by said video signals comprising, an image-reproducing device for each of the colors in which the image is to be reproduced, means for extracting from said complete video signal-modulated carrier wave video signals representative of a predetermined combination of several of said primary colors, means impressing said extracted video signals upon a first one of said image-reproducing devices, and means impressing said complete video signal-modulated carrier wave upon a second one of said image-reproducing devices.

4. In a three-color television system of the type in which three phases of a carrier wave are modulated by video signals respectively representative of three primary colors of a subject, apparatus for reproducing a two-color image of said subject comprising, two image-reproducing devices of which one is energizable to produce an image color corresponding to a predetermined combination of two of said primary colors, means for extracting from two phases of said video signal-modulated carrier wave video signals representative of said combination color, means impressing said extracted video signals upon and energizing said one image-reproducing device, and means impressing said complete video signal-modulated carrier wave upon and energizing the other of said image-reproducing devices.

5. In a three-color television system, two-color image-reproducing apparatus as defined in claim 4 wherein, the other of said image-reproducing devices is energizable to produce a second image color corresponding to a second predetermined combination of two of said primary colors.

6. In a color television system of the type in which three phases of a carrier wave are modulated by video signals respectively representative of the red, green and blue colors of a subject, apparatus for reproducing a two-color image of said subject comprising, two image-reproducing devices respectively energizable to produce orange and cyan colors, means for extracting from the red and green video signal-modulated phases of said carrier wave video signals representative of the orange color of said subject, means impressing said extracted video signals upon and energizing said orange color-producing image-reproducing device, and means impressing said complete video signal-modulated carrier wave upon and energizing said cyan color-producing image-reproducing device.

ALLEN A. BARCO.
WARREN H. BLISS.
MARSHALL M. CARPENTER, JR.

References Cited in the file of this patent

UNITED STATES PATENTS

| Number | Name | Date |
|---|---|---|
| 2,333,969 | Alexanderson | Nov. 9, 1943 |
| 2,554,693 | Bedford | May 29, 1951 |
| 2,567,040 | Sziklai | Sept. 4, 1951 |